United States Patent
Hu et al.

(10) Patent No.: US 12,377,741 B2
(45) Date of Patent: Aug. 5, 2025

(54) CHARGING APPARATUS AND NEW ENERGY VEHICLE

(71) Applicant: Huawei Digital Power Technologies Co., Ltd., Shenzhen (CN)

(72) Inventors: Yanjun Hu, Dongguan (CN); Feng Wen, Shenzhen (CN); Tianyu Wang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 586 days.

(21) Appl. No.: 17/877,519

(22) Filed: Jul. 29, 2022

(65) Prior Publication Data
US 2022/0363154 A1 Nov. 17, 2022

(30) Foreign Application Priority Data
Jul. 31, 2021 (CN) .......................... 202110876935.6

(51) Int. Cl.
*B60L 53/22* (2019.01)
*B60L 53/30* (2019.01)

(52) U.S. Cl.
CPC ............. *B60L 53/22* (2019.02); *B60L 53/305* (2019.02)

(58) Field of Classification Search
CPC .......... B60L 53/22; B60L 53/305; B60L 1/00; B60L 53/20; B60L 2240/545; B60L 2240/547; B60L 2240/549; B60L 58/18; B60L 58/20; B60L 58/26; B60L 58/27; B60L 58/30; B60L 58/40; B60L 50/70; Y02T 10/70; Y02T 10/7072; Y02T 90/14; Y02T 90/16

USPC ......................................................... 320/109
See application file for complete search history.

(56) References Cited

U.S. PATENT DOCUMENTS

| | | | |
|---|---|---|---|
| 8,860,363 | B2 | 10/2014 | Ang |
| 2012/0049794 | A1 | 3/2012 | Han et al. |
| 2015/0306964 | A1 | 10/2015 | Wang |
| 2018/0105058 | A1 | 4/2018 | Symanow et al. |
| 2019/0176642 | A1 | 6/2019 | Diab et al. |
| 2019/0329656 | A1* | 10/2019 | Badger, II ................ B60L 1/00 |

(Continued)

FOREIGN PATENT DOCUMENTS

| | | |
|---|---|---|
| CN | 102381209 A | 3/2012 |
| CN | 102035222 B | 9/2013 |

(Continued)

*Primary Examiner* — Paul Dinh
(74) *Attorney, Agent, or Firm* — Slater Matsil, LLP

(57) ABSTRACT

A charging apparatus is applied to a new energy vehicle. The new energy vehicle includes a first battery and a second battery. The first battery provides driving power for the new energy vehicle, and the second battery supplies power to a vehicle-mounted load device. The apparatus includes a charging unit and a general-purpose unit. The charging unit includes a DC-DC circuit and a BMS. The general-purpose unit includes a control module, a communication module, and an auxiliary power supply module. The auxiliary power supply module supplies power to the charging unit and the control module. The control module is configured to control the charging unit to provide electric energy of the first battery to the second battery. According to the apparatus provided in this application, a volume and a weight of the charging apparatus can be reduced, a service life of a battery can be prolonged.

20 Claims, 11 Drawing Sheets

(56) References Cited

U.S. PATENT DOCUMENTS

2020/0079233 A1    3/2020  Kim
2021/0252990 A1*   8/2021  Wang ..................... B60L 53/22
2022/0363154 A1   11/2022  Hu et al.

FOREIGN PATENT DOCUMENTS

| | | |
|---|---|---|
| CN | 105774589 A | 7/2016 |
| CN | 105978099 A | 9/2016 |
| CN | 106655421 A | 5/2017 |
| CN | 107017688 A | 8/2017 |
| CN | 107599857 A | 1/2018 |
| CN | 207481819 U | 6/2018 |
| CN | 108482126 A | 9/2018 |
| CN | 109130898 A | 1/2019 |
| CN | 110380634 A | 10/2019 |
| CN | 110641317 A | 1/2020 |
| CN | 111231767 A | 6/2020 |
| CN | 112389215 A | 2/2021 |
| CN | 212654235 U | 3/2021 |
| CN | 114312374 A | 4/2022 |
| JP | 2013031310 A | 2/2013 |
| KR | 20120020554 A | 3/2012 |

\* cited by examiner

CHARGING APPARATUS AND NEW ENERGY VEHICLE

CROSS-REFERENCE TO RELATED APPLICATIONS

This application claims priority to Chinese Patent Application No. 202110876935.6, filed on Jul. 31, 2021. The disclosures of the aforementioned applications are hereby incorporated by reference in their entireties.

TECHNICAL FIELD

This application relates to the field of charging and discharging technologies for new energy vehicles, and in particular, to a charging apparatus and a new energy vehicle.

BACKGROUND

With development of new energy vehicles and a requirement of a strategic goal of carbon neutrality, conventional fuel-powered vehicles are gradually replaced by new energy vehicles, such as battery electric vehicles (BEV), plug-in hybrid electric vehicles (PHEV), and hybrid electric vehicles (HEV). A power supply part of a new energy vehicle usually consists of a high voltage power battery and a low voltage battery. The low voltage battery is mainly configured to supply power to an automated driving device, a vehicle-mounted entertainment device, and another terminal device. With the development of the new energy vehicles, a quantity of the foregoing devices increases continuously. This leads to an ever-increasing demand for a low voltage load in the vehicle. In a conventional vehicle, a low voltage battery (a lead-acid (LA) battery or a starting lighting and ignition (SLI) battery) is still used to separately supply power to the foregoing devices. However, the low voltage battery used in the conventional vehicle has a large volume, a heavy weight, and a short service life, and consequently cannot meet a battery requirement after vehicle electrification. For example, the lead-acid battery encounters a serious power loss problem after staying standby for a long time or after being repeatedly used and aged. This ultimately affects use reliability of the whole vehicle and causes poor user experience. Therefore, currently, some manufacturers gradually perform lithium electrification on conventional low voltage batteries.

After lithium electrification is performed on a low voltage battery, an independent battery management system (BMS) needs to be configured for a low voltage battery obtained through the lithium electrification. The BMS has a complex internal structure, is difficult to control, uses a large quantity of components, occupies a large space, and has high costs. In addition, adding the BMS causes an increase of a new communication node and a control node in the vehicle, and greatly increases overall control difficulty of the new energy vehicle. In view of this, how to meet a battery-related requirement of a vehicle-mounted low voltage load device after vehicle electrification while simplifying a circuit and a control node is an urgent problem to be resolved by a person skilled in the art.

SUMMARY

This application provides a charging apparatus and a new energy vehicle, which can meet a battery-related requirement of a vehicle-mounted low voltage load device after vehicle electrification while simplifying a circuit and a control node.

According to a first aspect, this application provides a charging apparatus, applied to a new energy vehicle. The new energy vehicle includes a first battery and a second battery, the first battery is configured to provide driving power for the new energy vehicle, and the second battery is configured to supply power to a vehicle-mounted load device. The apparatus includes a charging unit and a general-purpose unit. The charging unit includes a direct current to direct current DC-DC circuit and a battery management system BMS. The general-purpose unit includes a control module, a communication module, and an auxiliary power supply module. The auxiliary power supply module is configured to supply power to the charging unit and the control module, and the communication module is configured to establish a communication connection for the control module and another circuit inside the new energy vehicle. The control module is configured to control the charging unit to provide, to the second battery, electric energy output by the first battery. The control module is further configured to: control the charging unit to connect the second battery to or disconnect the second battery from the first battery and the vehicle-mounted load device, and adjust charging and discharging power provided by the second battery for the vehicle-mounted load device.

In a possible implementation, the first battery and the second battery may include at least one of the following types of batteries: a lead-acid battery, a lithium ion battery, a nickel-hydrogen battery, a lithium polymer battery, a nickel-cadmium battery, and a super capacitor. In addition, the first battery may further be a hydrogen fuel cell and an external power supply device.

Based on the charging apparatus provided in this application, various types of functional circuits in the new energy vehicle that have different functions may be integrated. Specifically, an existing charging apparatus usually has many circuits that have a same function. Therefore, in this application, circuit-level integration is performed on circuits or modules that are in the DC-DC circuit and the BMS in the new energy vehicle and that have a same function, so that the circuits or modules are used together as the general-purpose unit, thereby reducing an occupied space and reducing costs. Another circuit in the charging apparatus shares each module in the general-purpose unit, so that different functions can be implemented, thereby decreasing a quantity of elements or components in the entire charging apparatus, reducing control difficulty of the various types of functional circuits, and reducing external communication nodes of the various types of functional circuits. This significantly reduces space occupancy.

In a possible implementation, the control module is specifically configured to control the DC-DC circuit to provide, to the second battery, the electric energy output by the first battery. The control module is specifically configured to: control the BMS to connect the second battery to or disconnect the second battery from the DC-DC circuit and the vehicle-mounted load device, and adjust the charging and discharging power provided by the second battery for the vehicle-mounted load device. The DC-DC circuit in the charging unit can convert a direct current output by the first battery into a charging voltage of the second battery. In a specific implementation, the DC-DC circuit may be formed by components such as a switching transistor, a diode, an inductor, and a capacitor. In addition, in some scenarios (when the second battery has a power loss), the DC-DC circuit in the charging unit may be further configured to directly provide, to the vehicle-mounted load device, the direct current output by the first battery.

By using the foregoing structure of the charging unit, the direct current output by the first battery may be converted into the charging voltage of the second battery. The BMS may further detect whether an electric arc fault occurs at each electrical connection point, and perform corresponding protection. In addition, one control module is used to control both the DC-DC circuit and the BMS, so that the new energy vehicle can perform coordinated scheduling on its own power supply function and energy storage function. Compared with a conventional technology in which a controller is separately disposed in each independent functional module for control, this application is more flexible, and a finally implemented control policy is more proper. This can improve reliability of power supply to the vehicle-mounted load device, improve a degree of freedom in executing a charging and discharging policy by the second battery, and further prolong a service life of the second battery.

To reduce a communication node and a control node in the new energy vehicle, in a possible implementation, the charging unit further includes an on-board charger OBC unit, and the control module is further configured to control the OBC unit to convert an alternating current input by an input alternating current source into a direct current, to provide the direct current for the first battery. In the foregoing structure, under control by the control module, the direct current may be provided as charging electric energy for the first battery, thereby reducing the communication node and the control node in the new energy vehicle.

To simplify a circuit structure for charging the second battery, in a possible implementation, the OBC unit further includes: a primary-side circuit, a first secondary-side circuit, and a second secondary-side circuit, and the primary-side circuit is separately coupled to the first secondary-side circuit and the second secondary-side circuit. The primary-side circuit is connected to the input alternating current source, the first secondary-side circuit is connected to the first battery, the second secondary-side circuit is connected to the second battery, the first secondary-side circuit includes a first secondary-side winding, the second secondary-side circuit includes a second secondary-side winding, and a quantity of first secondary-side windings is not less than a quantity of second secondary-side windings. The primary-side circuit is configured to receive the alternating current input by the alternating current input source, and separately output electric energy to the first secondary-side circuit and the second secondary-side circuit.

In a possible implementation, the charging unit further includes a vehicle control unit (VCU); and the VCU is configured to perform vehicle control on the new energy vehicle. By using the foregoing structure, the charging apparatus can implement functions of the new energy vehicle, such as charging/discharging timing and power-on/off timing.

To implement a voltage detection function, a current detection function, and a temperature detection function, in a possible implementation, the general-purpose unit further includes a voltage sampling module and a current sampling module. The voltage sampling module is configured to detect an operating voltage of the second battery. The current sampling module is configured to detect an operating current of the second battery. The general-purpose unit further includes a temperature sampling module. The temperature sampling module is configured to detect an operating temperature of the second battery.

To ensure that the charging unit can work normally and safely, in a possible implementation, the general-purpose unit further includes a functional safety module. The functional safety module is configured to: obtain the operating voltage of the second battery and the operating current of the second battery; and when the operating voltage of the second battery is outside a specified voltage range, send an alarm signal to the control module; or when the operating current of the second battery is outside a specified current range, send an alarm signal to the control module. The control module is further configured to: when receiving the alarm signal, control the charging unit to disconnect the second battery from the first battery and the vehicle-mounted load device.

To perform thermal management on a vehicle-mounted battery and prolong a service life of the vehicle-mounted battery, in a possible implementation, the charging apparatus further includes an integrated vehicle thermal management unit. The integrated vehicle thermal management unit includes a heating module and a cooling module. The control module is further configured to: obtain the operating temperature of the second battery; and when the operating temperature of the second battery is lower than a first threshold temperature, control the heating module in the integrated vehicle thermal management unit to heat the second battery; or when the operating temperature of the second battery is higher than a second threshold temperature, control the cooling module in the integrated vehicle thermal management unit to cool the second battery. The first threshold temperature is lower than the second threshold temperature.

In a possible implementation, the control module is further configured to control the charging unit to provide, to the vehicle-mounted load device, the electric energy output by the first battery.

EMC noise is an inevitable interfering signal generated by an electronic device in use. The EMC noise includes differential mode noise and common mode noise. Consequently, in a conventional technology, an EMC filter circuit is independently designed for each of a corresponding DC-DC circuit and a BMS. The EMC filter circuit also occupies a relatively large space, and has high costs. In view of this, in a possible implementation, the general-purpose unit further includes: an electromagnetic compatibility EMC module. The EMC module includes at least one filter inductor. The EMC module is configured to suppress differential mode noise and common mode noise in the charging unit by using the at least one filter inductor. By using the foregoing structure, the differential mode noise and the common mode noise in the charging unit are suppressed by using the at least one filter inductor. Because the entire charging apparatus has only one pair of external power connections, the EMC module can be connected to an input terminal and an output terminal of the entire charging unit. This simplifies design and further suppresses the differential mode noise and the common mode noise.

To reduce overall power consumption of the charging apparatus, when still staying in a working state after a period of time, each component in the charging apparatus enters a sleep state, thereby saving electric energy. In a possible implementation, the charging apparatus includes a gun insertion status detection circuit. The general-purpose unit further includes a wake-up module. The gun insertion status detection circuit is configured to detect an access resistance of a charging gun, and send a wake-up signal to the wake-up module based on the access resistance. The wake-up module is configured to start the control module after receiving the wake-up signal.

Integrated modularization exists throughout a whole process of development, process design, and other steps of the new energy vehicle. This helps reduce a quantity of parts, improve assembly efficiency, reduce material costs, and shorten a development cycle. In a possible implementation, the second battery and the charging unit are installed in a same housing. By using the foregoing structure, control wire harnesses used for sampling signals of the second battery, such as a cell voltage signal, a charging current signal, a cell temperature signal, and a voltage balancing control signal, may be integrated inside the charging unit, thereby reducing a vehicle communication wire harness. In addition, a power cable of the second battery may also be integrated inside the charging unit, and the entire charging unit has only one pair of external power connections, thereby simplifying a vehicle power wire harness and reducing wire harness costs. In addition, a thermal management function of the second battery in high and low temperature scenarios is further implemented, thereby prolonging a service life of the battery while ensuring battery reliability. This further reduces the communication node and the control node in the new energy vehicle.

According to a second aspect, this application provides a new energy vehicle. The new energy vehicle includes a first battery, a second battery, and the charging apparatus according to any implementation of the first aspect. The first battery is configured to provide driving power for the new energy vehicle, and the second battery is configured to supply power to a vehicle-mounted load device. For a technical effect of a corresponding solution in the second aspect, refer to the technical effect that can be achieved by the corresponding solution in the first aspect. Repeated content is not described in detail.

These or other aspects of this application are more concise and easier to understand in the description of the following embodiments.

DETAILED DESCRIPTION OF ILLUSTRATIVE EMBODIMENTS

To make the objectives, technical solutions, and advantages of this application clearer, the following further describes this application in detail with reference to accompanying drawings. It should be noted that, in the description of this application, "at least one" refers to one or more, and "a plurality of" refers to two or more. In view of this, in the embodiments of the present disclosure, "a plurality of" may alternatively be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, it should be understood that in descriptions of this application, terms such as "first" and "second" are merely used for differentiation and description, but should not be understood as an indication or implication of relative importance or an indication or implication of an order.

It should be noted that, in the embodiments of this application, "coupling" refers to an energy transfer relationship, for example, that A and B are coupled means that energy can be transferred between A and B. Energy may have a plurality of specific forms, such as electric energy and magnetic field potential energy. When electric energy can be transferred between A and B, as reflected in a circuit connection relationship, A and B may be directly electrically connected, or may be indirectly connected through another conductor or circuit element. When magnetic field potential energy can be transferred between A and B, as reflected in a circuit connection relationship, electromagnetic induction may occur between A and B, so that the magnetic field potential energy can be transferred from A to B. In view of this, in the embodiments of this application, "magnetic coupling" specifically refers to a scenario in which energy can be transferred between A and B through a magnetic field.

The following clearly describes the technical solutions in embodiments of this application with reference to the accompanying drawings in embodiments of this application.

Figure 1:
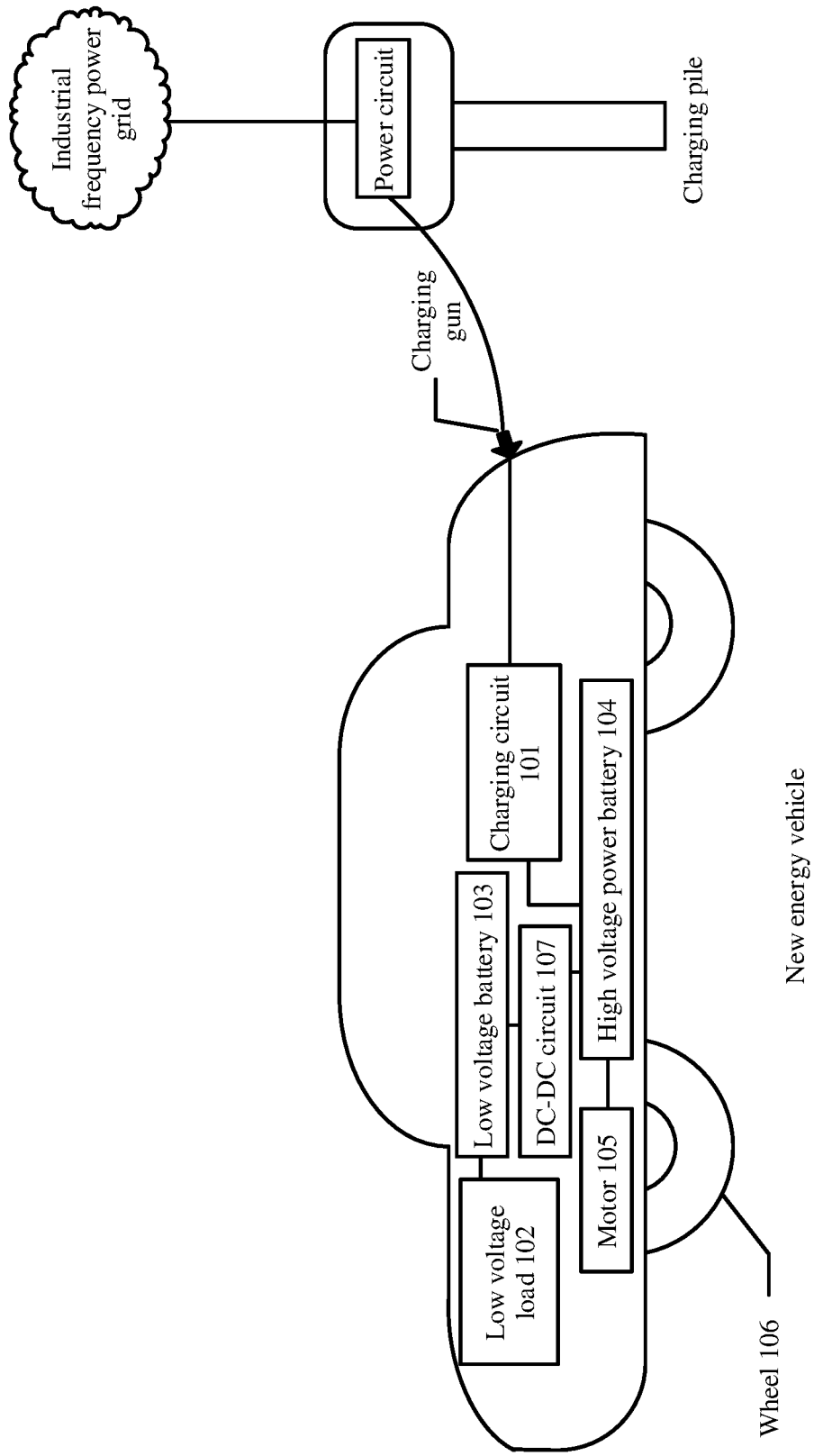
FIG. 1 is a schematic diagram of a system structure of a new energy vehicle.

With development of new energy vehicles, conventional fuel-powered vehicles are gradually replaced by new energy vehicles. As an example, FIG. 1 is a schematic diagram of a system structure of a new energy vehicle. The new energy vehicle mainly includes a charging circuit 101, a low voltage load device 102, a low voltage battery 103, a high voltage power battery 104, a motor 105, wheels 106, and a DC-DC circuit 107. The low voltage load device 102 may be a functional circuit or a vehicle-mounted device inside the new energy vehicle. The high voltage power battery 104 may be a large-capacity high-power battery.

When the new energy vehicle travels, the high voltage power battery 104 can drive the motor 105 to operate, and the motor 105 further drives the wheels 106 to rotate, so as to implement movement of the new energy vehicle. In addition, the high voltage power battery 104 may further supply power to the low voltage battery 103 through the DC-DC circuit 107, or may supply power to an external load (for example, another new energy vehicle) of the new energy vehicle through the charging circuit 101.

Generally, new energy vehicles may be charged by using charging piles. This is similar to a relationship between a fuel station and a conventional vehicle. The charging pile can "fuel" the new energy vehicle, that is, can charge the new energy vehicle. Still referring to FIG. 1, the charging pile mainly includes a power supply circuit and a charging gun. One terminal of the power supply circuit is coupled to an industrial-frequency power grid, and the other terminal is coupled to the charging gun through a cable. Usually, the power supply circuit in the charging pile may use the industrial-frequency power grid as an alternating current input source, receive an alternating current provided by the industrial-frequency power grid, and convert the received alternating current into charging electric energy that adapts to the new energy vehicle. An operator may insert the charging gun into a charging inlet of the new energy vehicle, so that the charging gun is coupled to the charging circuit 101 in the new energy vehicle. Further, the power supply circuit of the charging pile can provide charging electric energy to the charging circuit 101 through the charging gun. The charging circuit 101 provides a part of received charging electric energy to the high voltage power battery 104, and the high voltage power battery 104 further stores the part of electric energy. Usually, the charging circuit 101 in the new energy vehicle has at least two operating modes: a charging mode and a discharging mode. Specifically, in the charging mode, the charging circuit 101 receives the charging electric energy provided by the charging pile, and provides the received charging electric energy to the high voltage power battery 104. In the discharging mode, the charging circuit 101 receives battery electric energy provided by the high voltage power battery 104, and the charging circuit 101 may also provide, for an external vehicle load, the battery electric energy provided by the high voltage power battery 104.

A quantity of low voltage load devices 102 inside the new energy vehicle increases continuously. This leads to an ever-increasing demand for a low voltage load in the new energy vehicle. In a conventional vehicle, a low voltage battery or a starting lighting and ignition battery is still used as the low voltage battery 103 to separately supply power to the foregoing terminal components. In this case, the low voltage battery 103 has disadvantages of a large volume, a heavy weight, and a short service life. Therefore, currently, some manufacturers gradually perform lithium electrification on the low voltage battery 103.

After lithium electrification is performed on a low voltage battery, an independent BMS needs to be configured for the low voltage battery 103. The BMS has a complex internal structure. In addition, the BMS and a charging component that supplies power to the low voltage battery are designed independently, causing a large quantity of components, a large occupied space, and high costs. Consequently, overall control difficulty of the new energy vehicle greatly increases. In view of this, this application provides a charging apparatus, configured to integrate various types of functional circuits in a new energy vehicle that have different functions, thereby decreasing a quantity of elements or components in the entire charging apparatus, reducing control difficulty of the various types of functional circuits, and reducing external communication nodes of the various types of functional circuits. This significantly reduces space occupancy.

Figure 2:
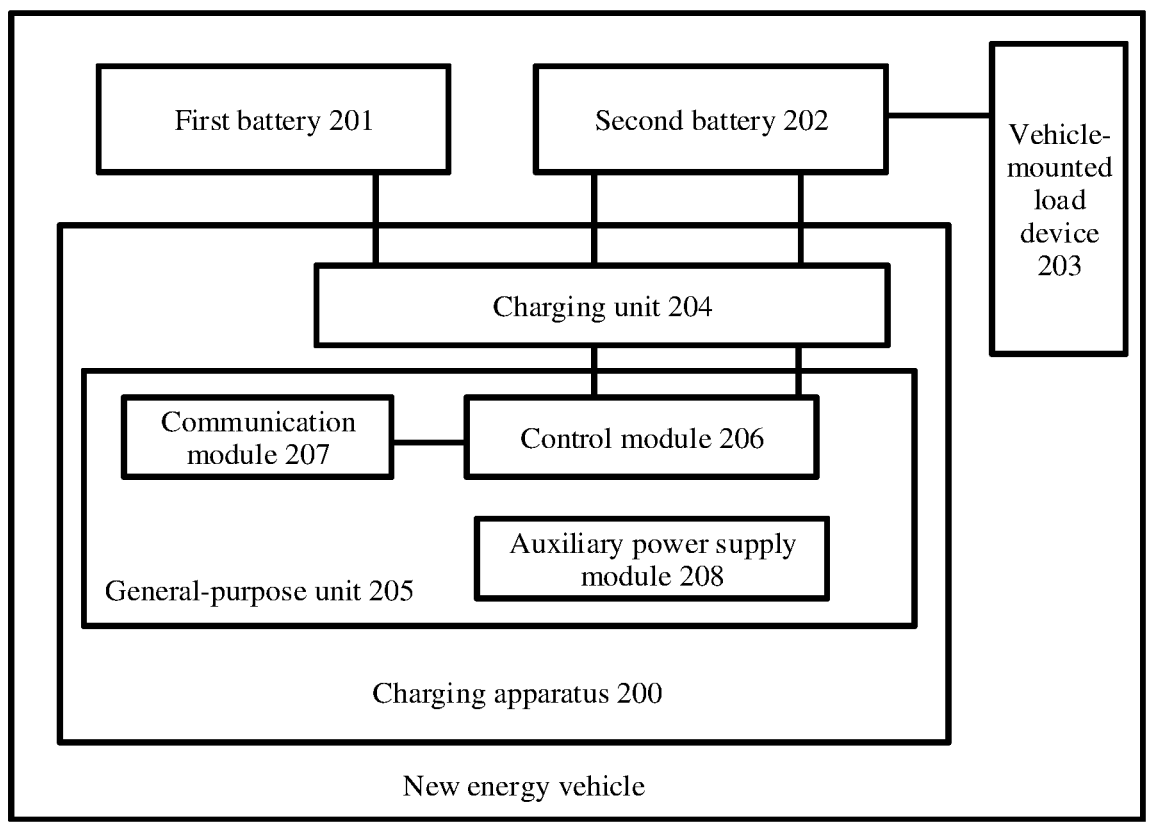
FIG. 2 is a schematic diagram of a first structure of a charging apparatus.

FIG. 2 is a schematic diagram of a first structure of a charging apparatus. A charging apparatus 200 provided in this application may be applied to a new energy vehicle but is not limited thereto. When the charging apparatus 200 is applied to a new energy vehicle, the new energy vehicle may include a first battery 201 and a second battery 202. The first battery 201 is configured to provide driving power for the new energy vehicle, and the second battery 202 is configured to supply power to a vehicle-mounted load device 203.

The charging apparatus 200 provided in this application includes a charging unit 204 and a general-purpose unit 205. The general-purpose unit 205 includes a control module 206, a communication module 207, and an auxiliary power supply module 208. The auxiliary power supply module 208 is configured to supply power to the charging unit 204 and the control module 206. The communication module 207 is configured to establish a communication connection for the control module 206 and another circuit inside the new energy vehicle.

The control module 206 is configured to control the charging unit 204 to provide, to the second battery 202, electric energy output by the first battery 201. The control module 206 is further configured to: control the charging unit 204 to connect the second battery 202 to or disconnect the second battery 202 from the first battery and the vehicle-mounted load device 203, and adjust charging and discharging power provided by the second battery 202 for the vehicle-mounted load device 203.

Figure 3:
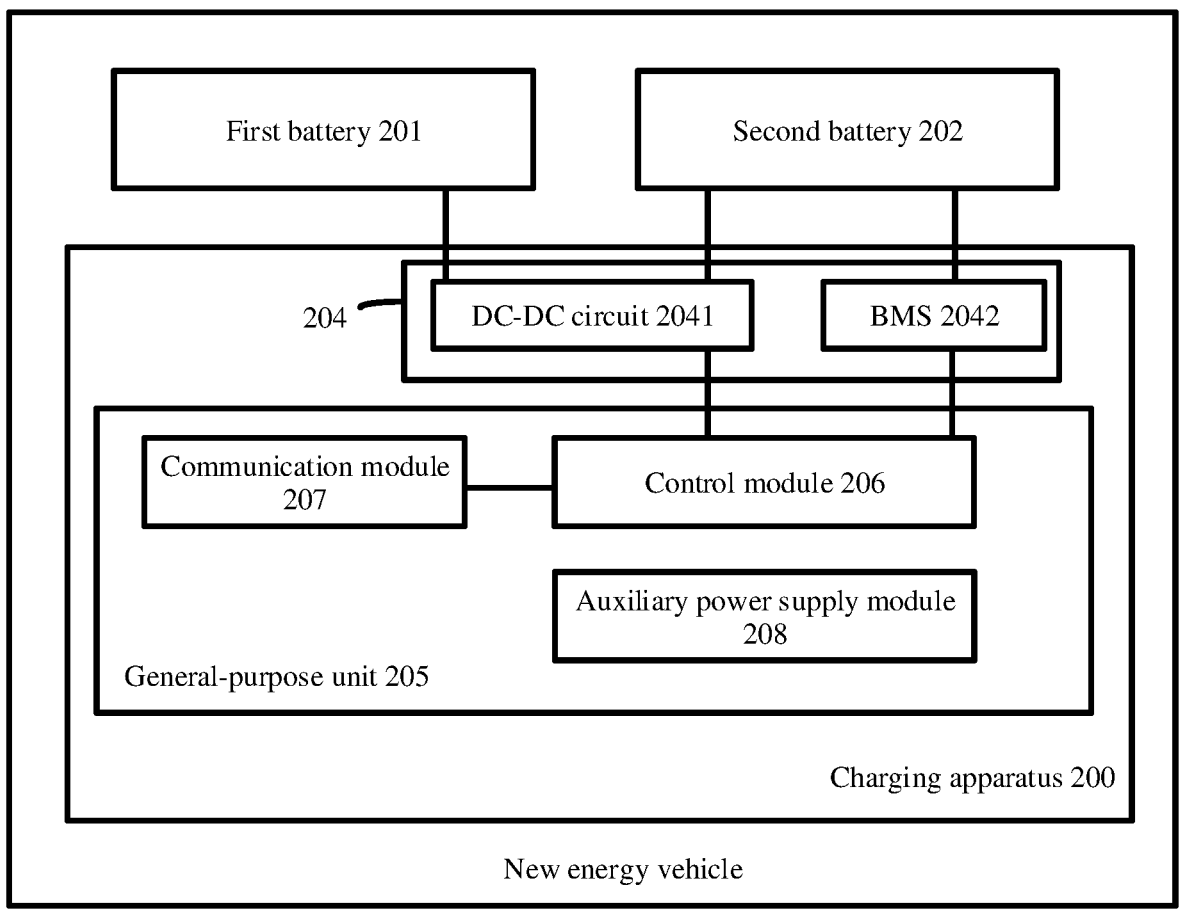
FIG. 3 is a schematic diagram of a second structure of a charging apparatus.

FIG. 3 is a schematic diagram of a second structure of a charging apparatus. The charging unit 204 may include a direct current to direct current DC-DC circuit 2041 and a battery management system BMS 2042. The control module 206 is specifically configured to control the DC-DC circuit 2041 to provide, to the second battery 202, the electric energy output by the first battery 201. The control module 206 is specifically configured to: control the BMS 2042 to connect the second battery 202 to or disconnect the second battery 202 from the DC-DC circuit 2041 and the vehicle-mounted load device 203, and adjust the charging and discharging power provided by the second battery 202 for the vehicle-mounted load device 203.

Optionally, the charging unit 204 provided in this embodiment of this application may further include, but is not limited to, functional modules such as a vehicle control unit and a thermal management unit, to further implement function integration between the foregoing modules. An integration implementation method for the foregoing functional modules is specifically described in the following embodiments, and details are not described herein.

Next, as an example, the first battery 201 to the auxiliary power supply module 208 are separately described in detail.

In an embodiment of this application, the first battery 201 may be a high-voltage large-capacity high-power battery, and is configured to drive the motor in the new energy vehicle to operate. Further, the motor drives the wheels to rotate, so as to implement travel of the new energy vehicle. The second battery 202 is configured to supply power to the vehicle-mounted load device 203. The first battery 201 and the second battery 202 may include at least one of the following types of batteries: a lead-acid battery, a lithium ion battery, a nickel-hydrogen battery, a lithium polymer battery, a nickel-cadmium battery, and a super capacitor. In addition, the first battery may further be a hydrogen fuel cell and an external power supply device. It should be noted that, any devices or components that can be configured to store or release electric energy may be used as the first battery 201 and the second battery 202 in this application. For example, the vehicle-mounted load device 203 may include but is not limited to a vehicle-mounted radio, a vehicle-mounted navigator, an assisted driving device, an automated parking device, and the like inside the new energy vehicle. Devices that can be powered by a low voltage (12 V/24 V/36 V/48 V) battery may all be considered as the vehicle-mounted load devices 203. These devices are not enumerated in this embodiment of this application.

In this embodiment of this application, the DC-DC circuit 2041 in the charging unit 204 can convert a direct current output by the first battery 201 into a charging voltage of the second battery 201. In specific implementation, the DC-DC circuit 2041 may be formed by components such as a switching transistor, a diode, an inductor, and a capacitor. An operating status of the DC-DC circuit 2041 is adjusted by adjusting operating statuses of the foregoing components (for example, the switching transistor).

It should be noted that, the switching transistor and a switch in this embodiment of this application may be one or more of a plurality of types of switching transistors such as a relay, a metal oxide semiconductor field effect transistor (MOSFET), a bipolar junction transistor (BJT), and an insulated gate bipolar transistor (IGBT). The switching transistors are not listed one by one in this embodiment of this application. Each switching transistor may include a first electrode, a second electrode, and a control electrode, and the control electrode is configured to control on or off of the switching transistor. When the switching transistor is turned on, a current can be transmitted between the first electrode and the second electrode of the switching transistor. When the switching transistor is turned off, no current can be transmitted between the first electrode and the second electrode of the switching transistor. The MOSFET is used as an example. The control electrode of the switching transistor is a gate, the first electrode of the switching transistor may be a source of the switching transistor, and the second electrode may be a drain of the switching transistor. Alternatively, the first electrode may be a drain of the switching transistor, and the second electrode may be a source of the switching transistor.

Optionally, in some scenarios (when the second battery 202 has a power loss), the DC-DC circuit 2041 in the charging unit may be further configured to directly provide, to the vehicle-mounted load device 203, the direct current output by the first battery 201. Specifically, a manner of using the first battery 201 for power supply should be known by a person skilled in the art. This is not specifically limited herein.

In this embodiment of this application, the BMS 2042 in the charging unit 204 is configured to manage a battery pack in the second battery 202, to prevent the battery pack in the second battery 202 from being overcharged or over-discharged, thereby prolonging a service life of the second battery 202. Specifically, there are a plurality of electrical connection points between the BMS 2042 and the second battery 202. The BMS 2042 detects whether an electric arc fault occurs at each electrical connection point, and performs corresponding protection. In addition, the BMS 2042 may further include a low voltage power distribution module. One terminal of the low voltage power distribution module is connected to the second battery 202, and the other terminal thereof may be connected to various types of vehicle-mounted load devices 203. For example, the low voltage power distribution module further includes at least one group of switch components, and each group of switch components include one main switch component and a plurality of device switch components. Each device switch component is connected to one vehicle-mounted load device 203. The BMS 2042 is configured to control a switch status of each device switch component, so as to control power supply to different vehicle-mounted load devices 203. In addition, the BMS 2042 may be further configured to perform balancing processing on a quantity of electricity of each battery pack in the second battery 202, to prevent a safety hazard caused by unbalanced discharge of each battery pack.

In this embodiment of this application, the general-purpose unit 205 includes the control module 206, the communication module 207, and the auxiliary power supply module 208. An existing DC-DC circuit and BMS usually have many circuits that have a same function. Therefore, in this application, circuit-level integration is performed on circuits or modules that are in the DC-DC circuit and the BMS in the new energy vehicle and that have a same function, so that the circuits or modules are used together as the general-purpose unit 205, thereby reducing an occupied space and reducing costs. It should be noted that, the general-purpose unit 205 includes but is not limited to the control module 206, the communication module 207, and the auxiliary power supply module 208 defined above. Another circuit in the charging apparatus 200 shares each module in the general-purpose unit 205, so that different functions can be implemented. For example, the general-purpose unit 205 may further include a system basis chip (SBC), to implement functions such as security monitoring on devices in the vehicle. In the following embodiments, the general-purpose unit 205 is described in more detail, and details are not described herein.

In this embodiment of this application, the control module 206 may include at least one controller. The at least one controller is configured to control all of the DC-DC circuit 2041 and the BMS 2042 in the charging unit 204 and another circuit in the charging apparatus 200. Therefore, the control module 206 in this application can have a function of controlling the DC-DC circuit 2041, the BMS 2042, and another circuit in the charging apparatus. For example, the control module 206 is used to control both the DC-DC circuit 2041 and the BMS 2042, so that the new energy vehicle can perform coordinated scheduling on its own power supply function and energy storage function. Compared with a conventional technology in which a controller is separately disposed in each independent functional module for control, this application is more flexible, and a finally implemented control policy is more proper. This can improve reliability of power supply to the vehicle-mounted load device 203, improve a degree of freedom in executing a charging and discharging policy by the second battery 202, and further prolong a service life of the second battery 202.

Optionally, the controller may be any conventional processor, computer, or memory. A person of ordinary skill in the art should understand that the processor, computer, or memory may actually include a plurality of processors, computers, or memories that may or may not be stored in a same physical housing. Therefore, a reference to the processor or computer is understood as including a reference to a set of processors, computers, or memories that may or may not operate in parallel. Unlike using a single processor to perform steps described herein, each of other components such as the DC-DC circuit and the BMS may have its own processing subunit (processing core), and each processing subunit (processing core) performs only calculation related to a component-specific function.

The processor may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application.

Specifically, in this application, the control module 206 may be used to control the DC-DC circuit 2041 and the BMS 2042. For example, the control module 206 uses a control signal to control the DC-DC circuit 2041 to convert a first direct current output by the first battery 201 into a second direct current and input the second direct current to the second battery 202, or control the DC-DC circuit 2041 to convert a first direct current output by the first battery 201 into a third direct current and input the third direct current to each vehicle-mounted load device. In addition, the control module 206 uses a control signal to control the BMS 2042 to connect the second battery 202 to or disconnect the second battery 202 from the first battery 201 and the vehicle-mounted load device 203, and adjust the charging and discharging power provided by the second battery 202 for the vehicle-mounted load device 203.

In this embodiment of this application, the communication module 207 includes a communication circuit configured to implement a communication function, and the communication circuit communicates wirelessly with one or more devices directly or by using a communication network. For example, the communication circuit may communicate with devices inside and outside the vehicle by using a controller area network (CAN). The communication circuit may further communicate with an external device by using a 3G cell technology, for example, code division multiple access (CDMA), EVDo, a global system for mobile communications (GSM), or a general packet radio service (GPRS), or communicate with an external device by using a 4G cell technology, for example, long term evolution (LTE), or communicate with an external device by using a 5G cell technology. The communication circuit may communicate with an external device by using Wi-Fi and a wireless local area network (WLAN). Optionally, the communication circuit may further directly communicate with a device by using an infrared link, Bluetooth, or ZigBee. Other wireless protocols, for example, various vehicle communication systems, may be used. The vehicle communication system includes one or more dedicated short range communications (DSRC) devices. These devices may be used for public and/or private data communication between vehicles and/or roadside stations. In the charging apparatus 200, the DC-DC circuit 2041 and the BMS 2042 in the charging unit 204 and another functional module may share the communication module 207, so that there is only one communication node between the entire charging apparatus 200 and the vehicle. This reduces a quantity of nodes in a vehicle communication network.

In this embodiment of this application, the auxiliary power supply module 208 may include at least one auxiliary power supply, and each auxiliary power supply includes at least one channel of power supply that is output to the DC-DC circuit, the BMS, and the control module. An operating voltage of the auxiliary power supply may be 12 V, 3.3 V, or the like. For example, the auxiliary power supply is a rechargeable battery or a replaceable battery. When the auxiliary power supply is a rechargeable battery, the first battery 201 or the second battery 202 may charge the rechargeable battery. A cell material of the battery is not specifically limited.

Figure 4:
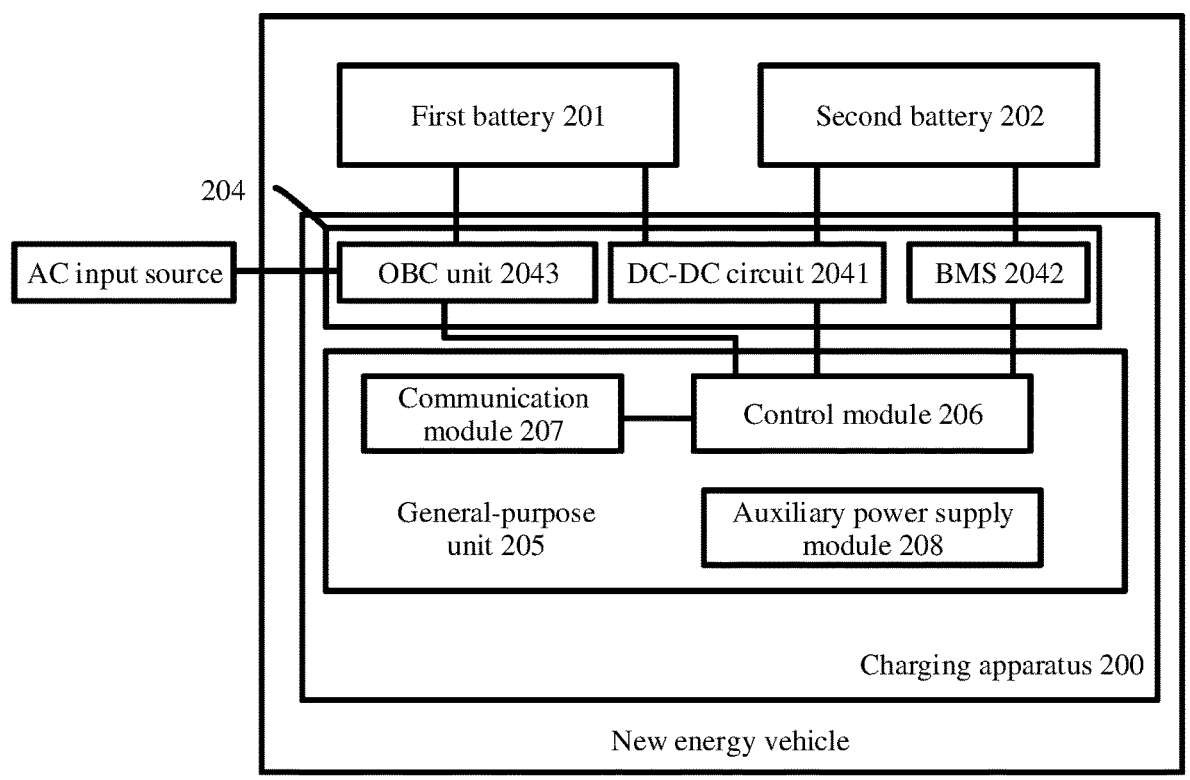
FIG. 4 is a schematic diagram of a third structure of a charging apparatus.

To reduce a communication node and a control node in the new energy vehicle, based on the foregoing embodiments, the charging apparatus 200 further has an OBC control function. FIG. 4 is a schematic diagram of a third structure of a charging apparatus. In some possible implementations, the charging unit 204 further includes an OBC unit 2043. The control module 206 in the general-purpose unit 205 is further configured to control the OBC unit 2043 to convert an alternating current input by an input alternating current source into a direct current, to provide the direct current for the first battery 201.

The OBC unit 2043 may include a primary-side circuit and a secondary-side circuit, and the primary-side circuit is magnetically coupled to the secondary-side circuit. The control module 206 in the general-purpose unit 205 generates a plurality of types of control signals to separately control operation of the primary-side circuit and the secondary-side circuit.

Optionally, the OBC unit 2043 may further include a power factor correction (PFC) circuit. The PFC circuit may receive charging electric energy in an alternating current form. Similarly, under control by the control module 206, the PFC circuit may perform power calibration on the charging electric energy in the alternating current form, convert charging electric energy obtained after power calibration into primary-side direct current electric energy, and provide the primary-side direct current electric energy for the primary-side circuit. In other words, the power supply circuit of the charging pile in FIG. 1 may also convert received alternating current electric energy into charging electric energy in a direct current form, and provide the charging electric energy in the direct current form for the OBC unit 2043. Electric energy used to charge the power battery may have a direct current form or an alternating current form. Under control by the control module 206, a direct current serving as charging electric energy may be provided for the primary-side circuit as primary-side direct current electric energy. Charging electric energy in the alternating current form is first provided for the PFC circuit, and then the PFC circuit converts the charging electric energy in the alternating current form into primary-side direct current electric energy to provide the primary-side direct current electric energy for the primary-side circuit. Therefore, the new energy vehicle can not only adapt to an alternating current charging pile, but also adapt to a direct current charging pile, so that charging of the new energy vehicle is more convenient. In addition, the entire OBC unit 2043 is also controlled by the control module 206 in the general-purpose unit 205. Therefore, a communication node and a control node in the new energy vehicle can be further reduced.

To simplify a circuit structure for charging the second battery 202, optionally, the OBC unit 2043 may further specifically include: a primary-side circuit, a first secondary-side circuit, and a second secondary-side circuit, and the primary-side circuit is separately coupled to the first secondary-side circuit and the second secondary-side circuit. The primary-side circuit is connected to the input alternating current source, the first secondary-side circuit is connected to the first battery, the second secondary-side circuit is connected to the second battery, the first secondary-side circuit includes a first secondary-side winding, the second secondary-side circuit includes a second secondary-side winding, and a quantity of first secondary-side windings is not less than a quantity of second secondary-side windings. The primary-side circuit is configured to receive an alternating current input by the alternating current input source, and separately output electric energy to the first secondary-side circuit and the second secondary-side circuit. A plurality of switching transistors together form a bridge rectifier circuit structure. Each switch control electrode in the plurality of switching transistors is coupled to the control module 206. Usually, in two direct current terminals of the PFC circuit, one is a high voltage terminal and the other is a low voltage terminal. The low voltage terminal may be coupled to a ground circuit, and the low voltage terminal is considered as having a zero potential. This is not described in detail in this embodiment of this application.

The first secondary-side circuit may receive a part of primary-side alternating current electric energy provided by the primary-side circuit. Similarly, the first secondary-side circuit may include a plurality of switching transistors. In addition, the control module 206 may adjust, by changing period duration or a duty cycle of a control signal, a voltage value of electric energy that is output by the first secondary-side circuit to the first direct current. In this case, the plurality of switching transistors of the first secondary-side circuit may be turned on and turned off synchronously with a plurality of switching transistors of the primary-side circuit. It should be noted that, the foregoing circuit structures of the primary-side circuit and the first secondary-side circuit are merely examples. In a specific implementation structure, the primary-side circuit and the first secondary-side circuit may further have a plurality of possible implementations, which are not listed one by one in this embodiment of this application. Similarly, the primary-side circuit and the second secondary-side circuit are based on a same concept, and details are not described herein.

Currently, a module having a DC-DC function and a module having a BMS function usually require a voltage sampling function. Therefore, a corresponding voltage sampling circuit is usually designed in the module having the DC-DC function and the module having the BMS function. However, sampling parameters required by the foregoing functional modules are not exactly the same. A module configured to implement the DC-DC function needs to sample an input voltage input to the DC-DC circuit, to prevent the input voltage from being excessively high. The module configured to implement the DC-DC function further needs to sample a voltage output by the DC-DC circuit, to prevent a voltage output to the second battery 202 from being excessively high and from causing damage to the second battery 202. In addition, the module configured to implement the DC-DC function further needs to detect an operating voltage of the second battery 202, to prevent, based on the operating voltage of the second battery 202, the second battery 202 from being overcharged. In addition, a module configured to implement the BMS function also needs to detect an operating voltage of the second battery 202, to monitor battery health of the second battery 202 in real time.

Figure 5:
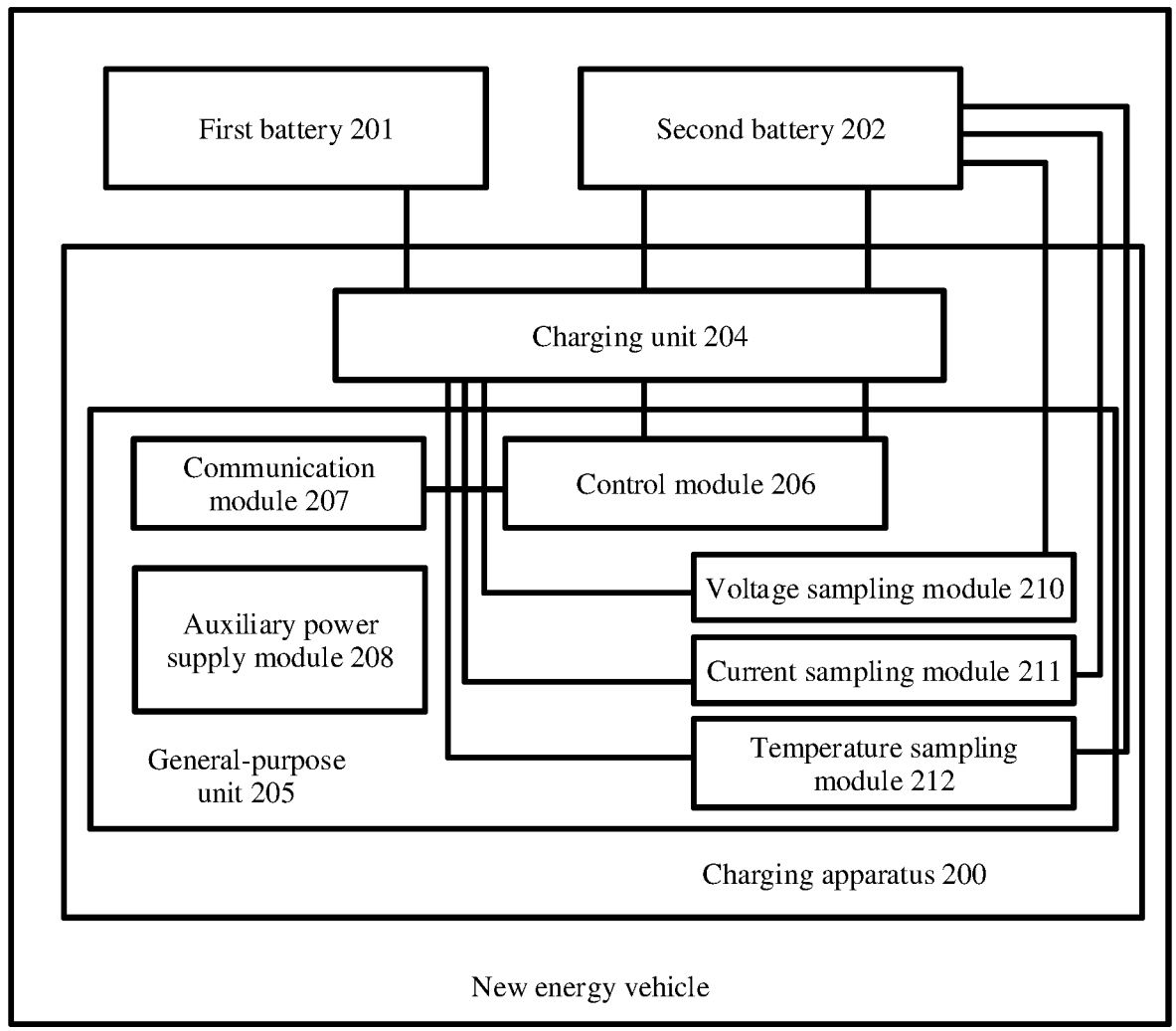
FIG. 5 is a schematic diagram of a fourth structure of a charging apparatus.

It can be learned from the foregoing analysis that, the module having the DC-DC function and the module having the BMS function both need to detect the operating voltage of the second battery 202. FIG. 5 is a schematic diagram of a fourth structure of a charging apparatus. In a possible implementation, the general-purpose unit 205 further includes a voltage sampling module 210, configured to detect the operating voltage of the second battery 202. Optionally, the voltage sampling module 210 may specifically include a sampling resistor. The operating voltage of the second battery 202 is determined by detecting a current flowing through the sampling resistor. In a specific implementation structure, the voltage sampling module 210 further has a plurality of possible structures and implementations, which are not listed one by one in this embodiment of this application.

Similarly, currently, the module having the DC-DC function and the module having the BMS function both usually have a current sampling function. Both the module having the DC-DC function and the module having the BMS function need to detect an operating current of the second battery 202. Therefore, still referring to FIG. 5, in a possible implementation, the general-purpose unit 205 further includes a current sampling module 211, configured to detect the operating current of the second battery 202. Optionally, the current sampling module 211 may include a current transformer (CT). The current transformer is an instrument that converts a primary-side large current into a secondary-side small current according to a principle of electromagnetic induction to perform measurement. The current transformer consists of a closed iron core and a winding. The operating current of the second battery 202 is detected by using a principle of electromagnetic mutual induction. Optionally, the operating current of the second battery 202 may be determined by measuring a connection cable inside the second battery 202. A magnetic field is generated around a cable being measured. After the current transformer is wrapped outside the cable, a coil on the current transformer generates an inductive current due to the magnetic field of the cable being measured. After the inductive current is amplified, a current flowing through the cable being measured can be obtained. Similarly, in a specific implementation structure, the current sampling module 211 also has a plurality of possible structures and implementations, which are not listed one by one in this embodiment of this application.

Based on a same concept, currently, the module having the DC-DC function and the module having the BMS function usually also include a temperature sampling function. Therefore, still referring to FIG. 5, in a possible implementation, the general-purpose unit 205 further includes a temperature sampling module 212, configured to detect an operating temperature of the second battery 202. Because the second battery 202 is usually in a lithium battery structure, a proper operating temperature of the second battery 202 is about 25° C. Therefore, the operating temperature of the second battery 202 needs to be monitored in real time. In a specific implementation structure, the temperature sampling module 212 also has a plurality of possible structures and implementations, which are not listed one by one in this embodiment of this application.

In addition, the charging apparatus 200 in this application may further include a circuit for sampling a voltage input into the DC-DC circuit, a circuit for sampling a voltage output by the DC-DC circuit, a circuit for sampling a temperature of a power tube in the DC-DC circuit, and the like that are required by a DC-DC charging module. A specific circuit structure should be known by a person skilled in the art, and details are not described herein.

Figure 6:
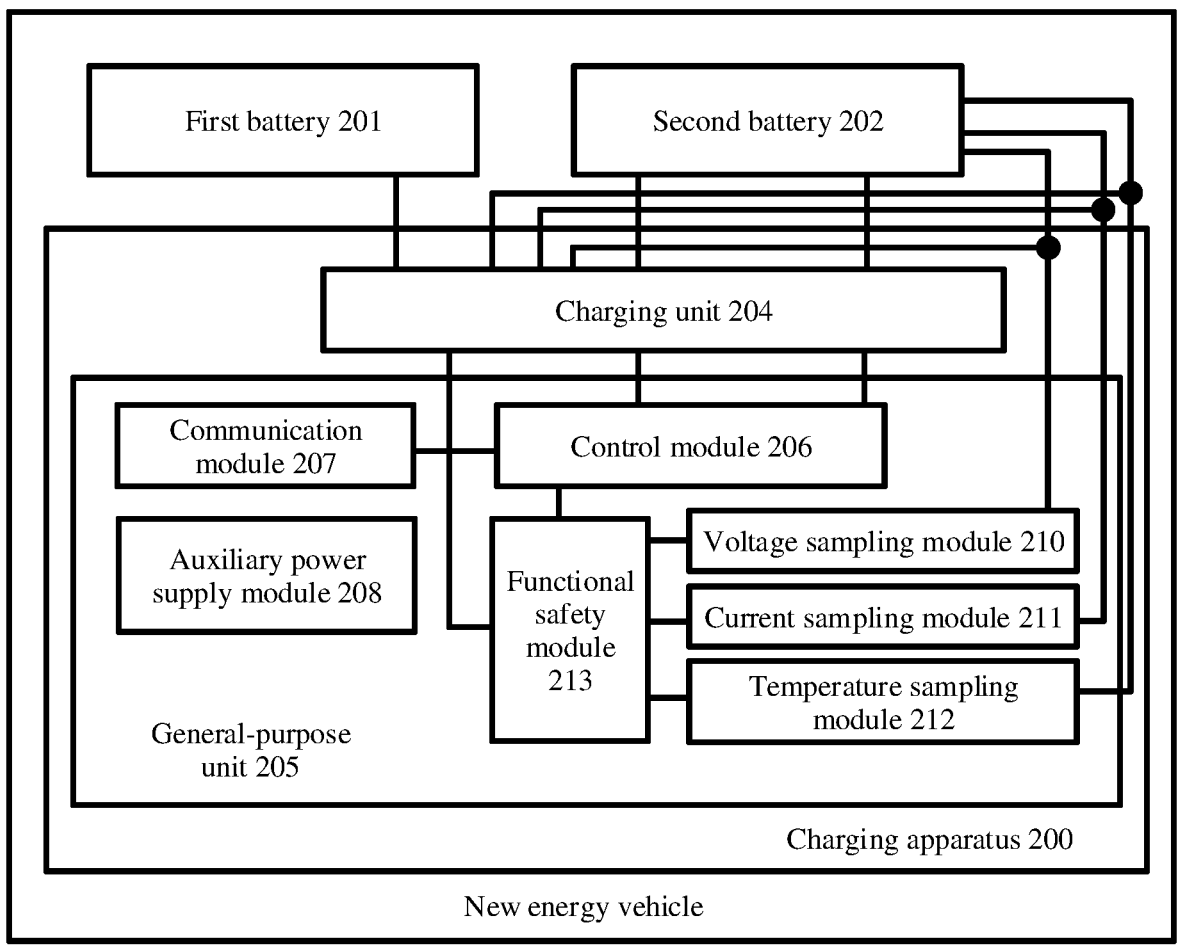
FIG. 6 is a schematic diagram of a fifth structure of a charging apparatus.

To ensure that the module having the DC-DC function and the module having the BMS function can work normally and safely, currently, the module having the DC-DC function and the module having the BMS function usually also have a functional safety module. FIG. 6 is a schematic diagram of a fifth structure of a charging apparatus. The general-purpose unit 205 further includes a functional safety module 213, configured to: obtain the operating voltage of the second battery 202 and the operating current of the second battery; and when the operating voltage of the second battery 202 is outside a specified voltage range, send an alarm signal to the control module 206; or when the operating current of the second battery 202 is outside a specified current range, send an alarm signal to the control module 206. The control module 206 in the general-purpose unit 205 is further configured to: when receiving the alarm signal, control the BMS 2042 to disconnect the second battery 202 from the first battery 201 and the vehicle-mounted load device 203.

Figure 7:
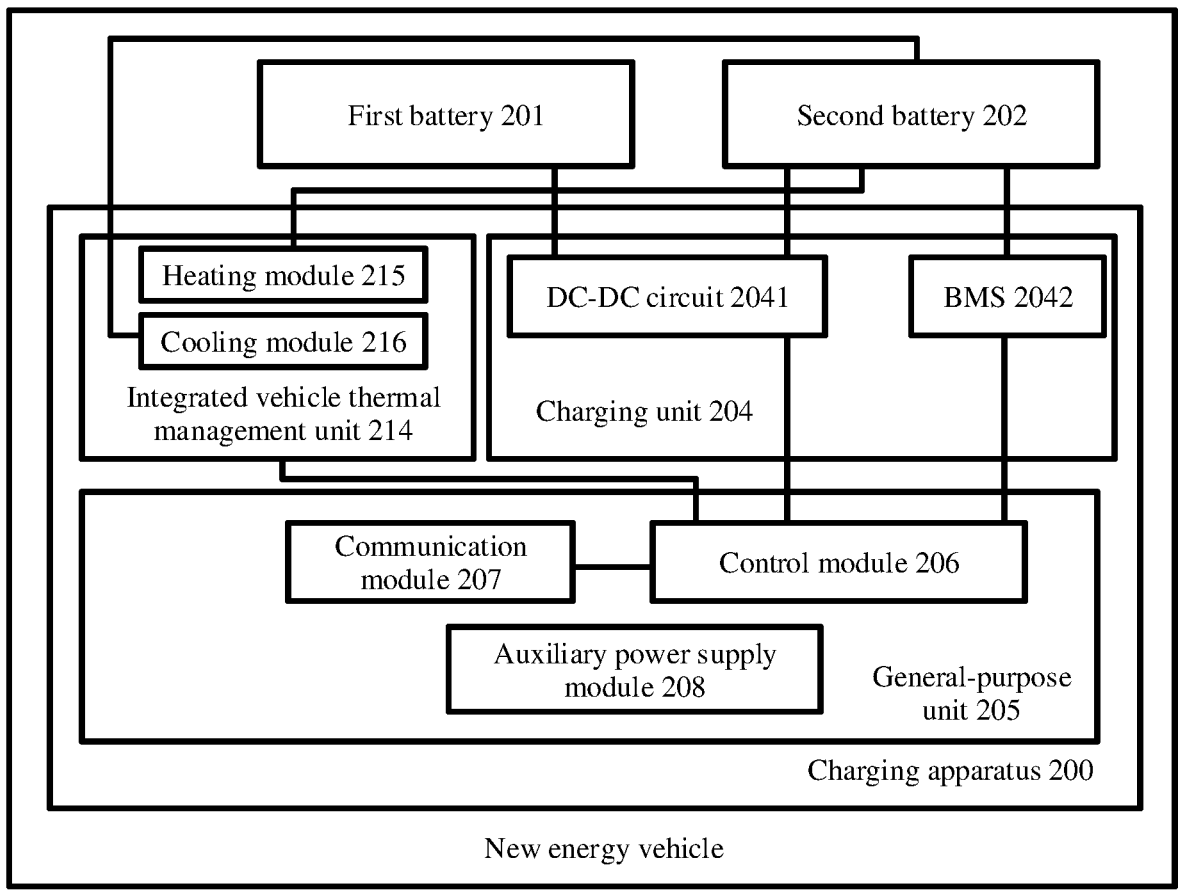
FIG. 7 is a schematic diagram of a sixth structure of a charging apparatus.

The second battery 202 is usually a lithium battery, and a suitable operating temperature of the lithium battery is about 25° C. Therefore, the charging apparatus 200 needs to have a module for performing thermal management on the second battery 202, to prolong a service life of the lithium battery. FIG. 7 is a schematic diagram of a sixth structure of a charging apparatus. In some possible implementations, the charging apparatus further includes an integrated vehicle thermal management unit 215, and the integrated vehicle thermal management unit 214 includes a heating module 215 and a cooling module 216. The control module 206 in the general-purpose unit 205 is further configured to: obtain the operating temperature of the second battery 202; and when the operating temperature of the second battery 202 is lower than a first threshold temperature, control the heating module 215 to heat the second battery 202; or when the operating temperature of the second battery 202 is higher than a second threshold temperature, control the cooling module 216 to cool the second battery 202. The first threshold temperature is lower than the second threshold temperature.

For example, the heating module 215 may be a water heater (WPTC) or a heat pump. For example, the water heater may be connected to the second battery 202 through a heat exchange pipe. The heat exchange pipe is filled with a coolant. The water heater is used to heat the coolant in the heat exchange pipe, and the heated coolant can heat the second battery 202. Optionally, the heating module 215 may further include a circulating water pump, and the circulating water pump is configured to drive the coolant to circulate in the heat exchange pipe, to implement rapid heating.

The cooling module 216 may include a radiator and a cooling fan. The radiator is connected to the second battery 202 through another heat exchange pipe. The cooling fan is configured to suck air into the radiator, and the radiator cools, by using the air whose temperature is an ambient temperature, a coolant heated by the second battery 202. Further, if it is detected that a temperature of the second battery 202 is excessively high, the second battery 202 may be cooled in a water cooling manner. Specifically, the second battery 202 may be cooled by using a liquid cooling plate. The liquid cooling plate performs a heat exchange with a refrigerant in another loop by using a heat exchanger. The another loop includes a compressor and a condenser. The condenser and the radiator may be placed side by side, and share a same air channel. After the cooling fan sucks air into the radiator, the air then enters the condenser. A phase change (a gas-liquid phase change) is performed on the refrigerant by using the condenser. A liquefied refrigerant has a relatively low temperature, and can cool a coolant in the heat exchanger, thereby achieving a better cooling effect. In the foregoing embodiment, the refrigerant may be ammonia gas, sulfur dioxide, non-halogenated hydrocarbons, or the like.

Figure 8:
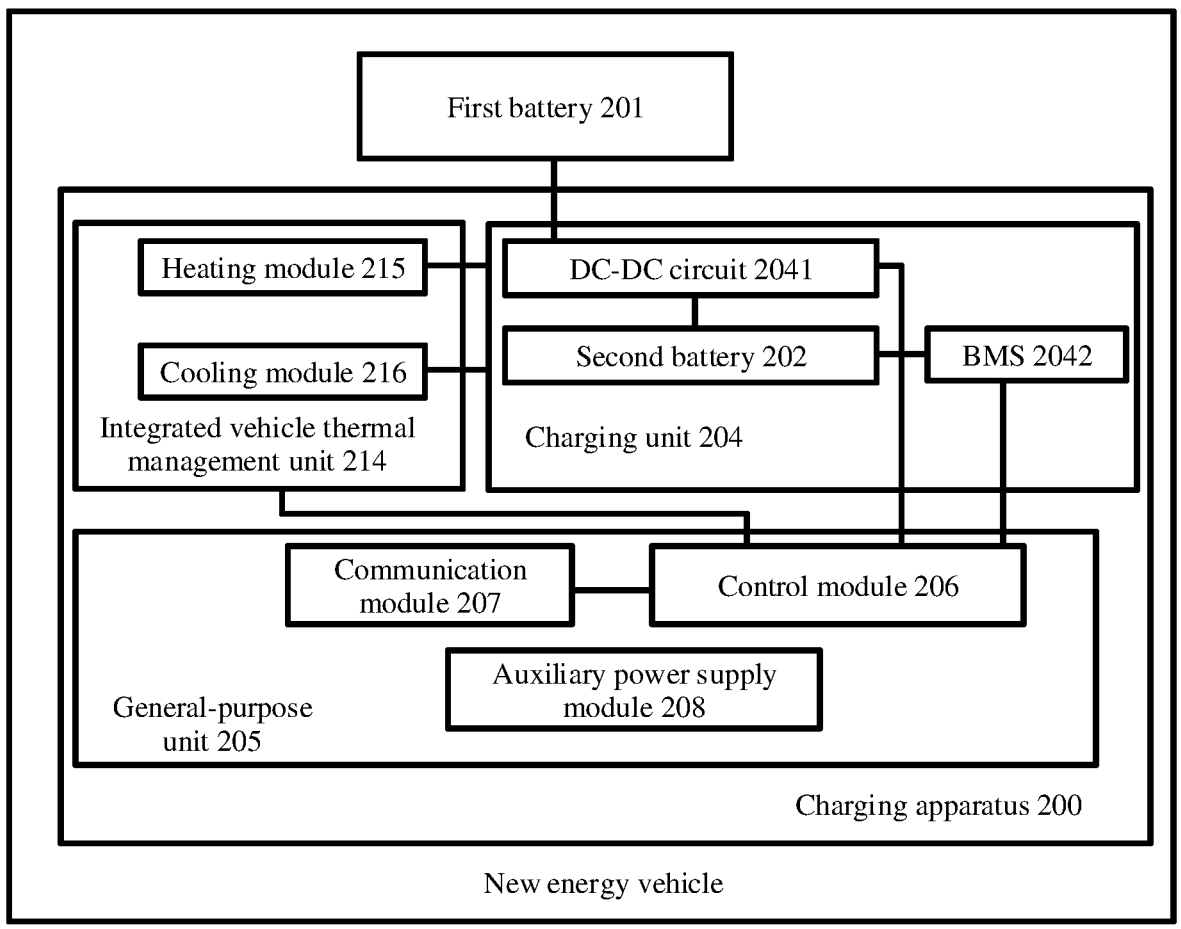
FIG. 8 is a schematic diagram of a seventh structure of a charging apparatus.

Integrated modularization exists throughout a whole process of development, process design, and other steps of the new energy vehicle. This helps reduce a quantity of parts, improve assembly efficiency, reduce material costs, and shorten a development cycle. Integrated modularization is a main development and design trend of new energy vehicles. FIG. 8 is a schematic diagram of a seventh structure of a charging apparatus. Based on an integrated modularization idea, when a location of the second battery 202 is designed, the second battery 202 and the charging unit 204 configured to charge the second battery 202 may be integrated in a same housing. Control wire harnesses used for sampling signals of the second battery 202, such as a cell voltage signal, a charging current signal, a cell temperature signal, and a voltage balancing control signal, may be integrated inside the charging unit 204, thereby reducing a vehicle communication wire harness. In addition, a power cable of the second battery 202 may also be integrated inside the charging unit 204, and the entire charging unit 204 has only one pair of external power connections, thereby simplifying a vehicle power wire harness and reducing wire harness costs. In addition, a thermal management function of the second battery 202 in high and low temperature scenarios is further implemented, thereby prolonging a service life of the battery while ensuring battery reliability.

In addition, the heating module 215 is further configured to heat both the second battery 202 and the charging unit 204. The cooling module 216 is further configured to cool both the second battery 202 and the charging unit 204.

In addition, based also on the integrated modularization idea, the second battery 202 may also be integrated with a module such as the OBC, to share a same heat exchange pipe. In this way, a service life of the foregoing module is greatly prolonged. In addition, an element such as a capacitor with a relatively short service life may further be selected to reduce costs of the entire charging apparatus 200. Optionally, all components in the charging apparatus 200 may be disposed on a same printed circuit board (PCB) substrate to further save a space.

Optionally, the first battery 201, the second battery 202, and the heating module 215 or the cooling module 216 may be connected in series in a same heat exchange pipe. A coolant in the heat exchange pipe is used to cool or heat both the first battery 201 and the second battery 202, thereby reducing overall thermal management costs, and ensuring that temperatures of the foregoing energy storage batteries are not excessively high.

Figure 9:
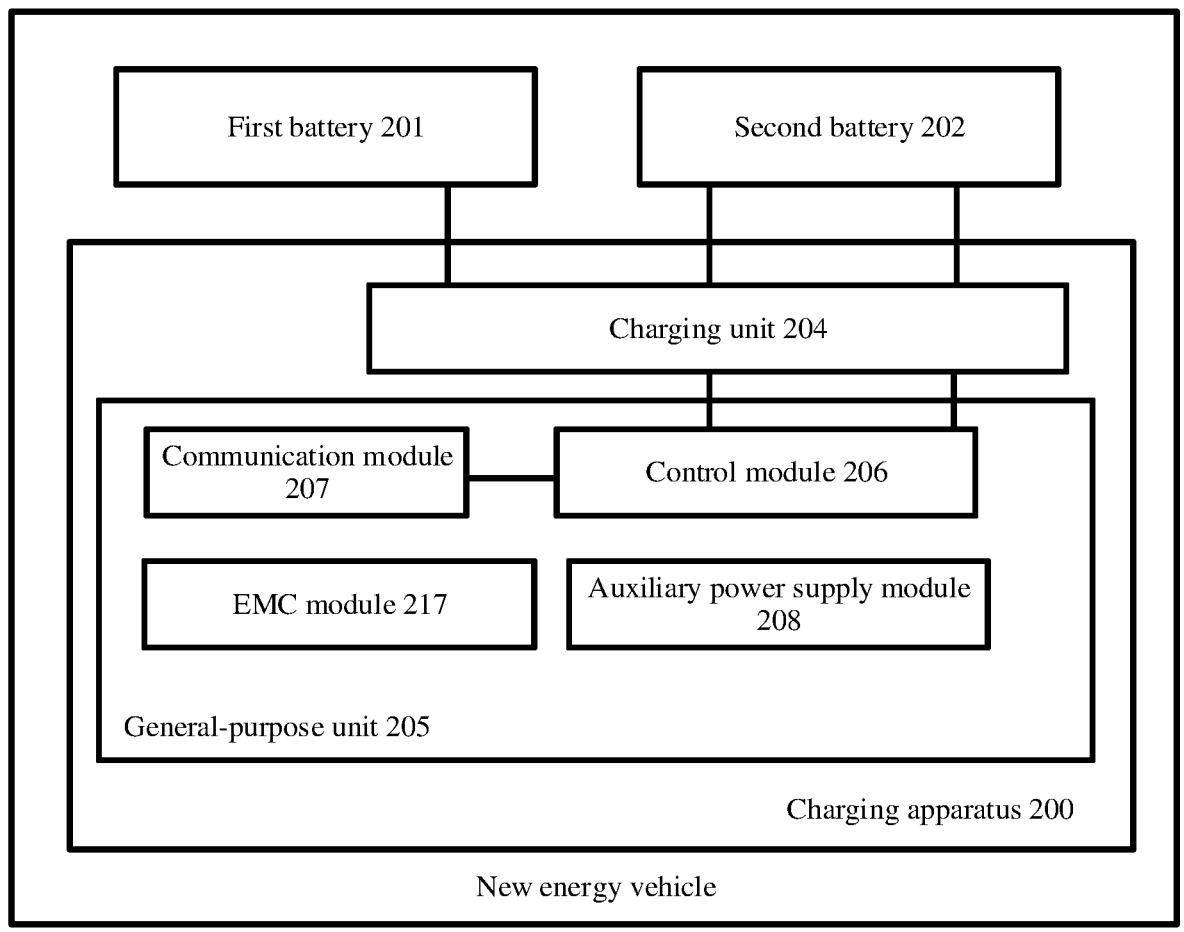
FIG. 9 is a schematic diagram of an eighth structure of a charging apparatus.

EMC noise is an inevitable interfering signal generated by an electronic device in use. The EMC noise includes differential mode noise and common mode noise. Consequently, in a conventional technology, an EMC filter circuit is independently designed for each of a corresponding DC-DC circuit and a BMS. The EMC filter circuit also occupies a relatively large space, and has high costs. In view of this, refer to FIG. 9. FIG. 9 is a schematic diagram of an eighth structure of a charging apparatus. In some possible implementations, the general-purpose unit 205 further includes an electromagnetic compatibility EMC module 217. The EMC module 217 includes at least one filter inductor. The EMC module 217 is configured to suppress differential mode noise and common mode noise in the charging unit 204 by using the at least one filter inductor. Optionally, because the entire charging apparatus 200 has only one pair of external power connections, the EMC module 217 can be connected to an input terminal and an output terminal of the entire charging unit 204. This simplifies design and further suppresses the differential mode noise and the common mode noise.

Figure 10:
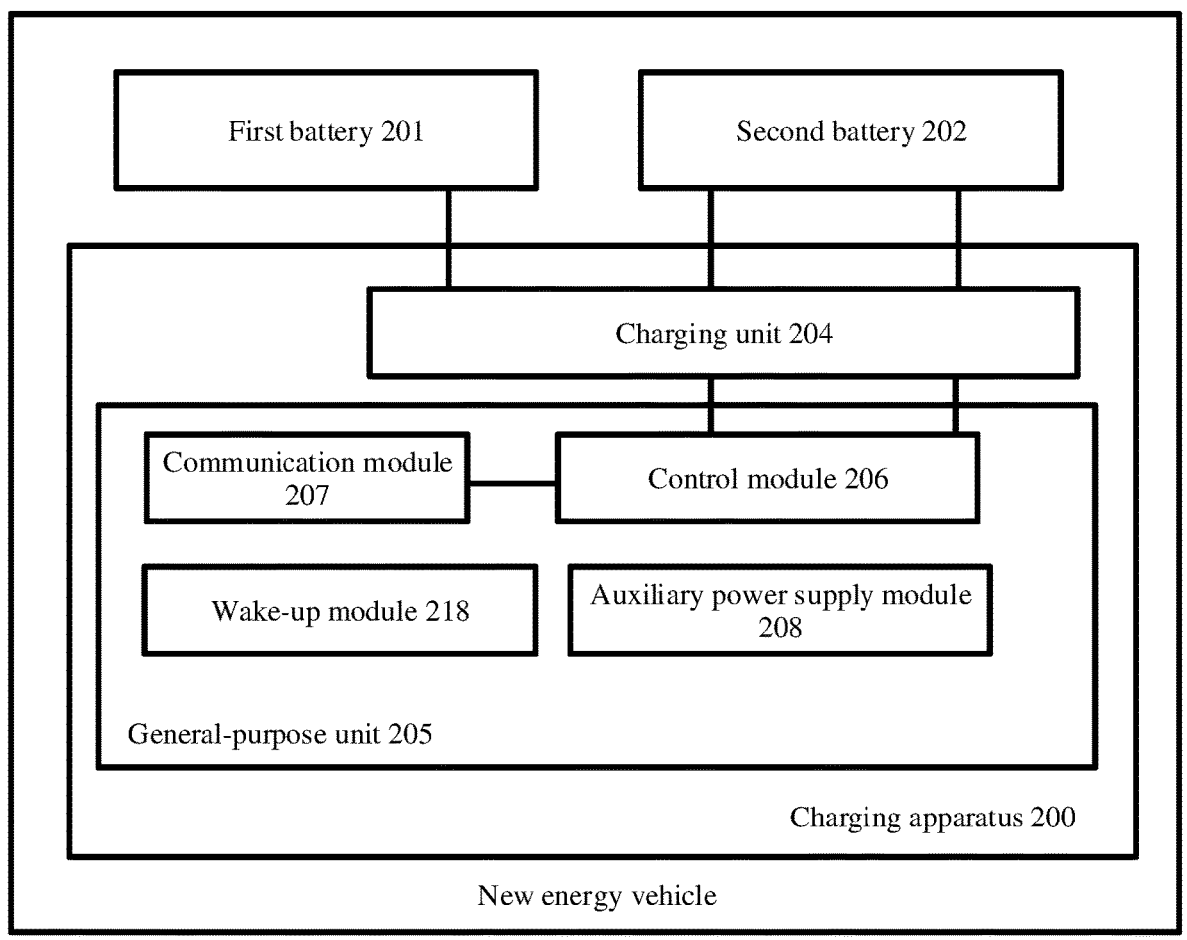
FIG. 10 is a schematic diagram of a ninth structure of a charging apparatus.

To reduce overall power consumption of the charging apparatus 200, when still staying in a working state after a period of time, each component in the charging apparatus 200 enters a sleep state, thereby saving electric energy. FIG. 10 is a schematic diagram of a ninth structure of a charging apparatus. In some possible implementations, the general-purpose unit 205 further includes a wake-up module 218. The wake-up module 218 is configured to start the control module 206 after receiving a wake-up signal. The wake-up signal may be sent by different types of devices. For example, the charging apparatus further includes a gun insertion status detection circuit. The gun insertion status detection circuit is configured to detect an access resistance of a charging gun, and send a wake-up signal to the wake-up module 218 based on the access resistance.

Specifically, according to a standard of an electric vehicle conductive charging system, in addition to an electrical connection, two signal ports exist between a charging gun on a charging pile and a charging inlet. The two signal ports are a control pilot (CP) signal port used to transmit a CP signal and a connection confirm (CC) signal port used to transmit a CC signal. A circuit between the CC signal port of the charging inlet and the gun insertion status detection circuit is purely resistive, and the CP signal is a PWM wave. After the charging gun is inserted into the charging inlet, the gun insertion status detection circuit identifies a resistance between the port and the gun insertion status detection circuit by comparing CC signals, so as to determine a power supply capability of the charging pile and a type of a charging cable connected between the charging pile and the gun insertion status detection circuit. In addition, the gun insertion status detection circuit further determines an output power of the charging pile based on a duty cycle of the CP signal. When the charging pile does not provide electric energy for the new energy vehicle, the new energy vehicle enters a sleep state, thereby saving electric energy and preventing a power loss of the power battery. The gun insertion status detection circuit keeps a specific voltage to monitor the CC signal in real time, and sends the wake-up signal to the wake-up module 218 after detecting the CC signal. In addition, in a specific implementation structure, the wake-up signal may be further triggered in a plurality of possible implementations, which are not listed one by one in this embodiment of this application.

Figure 11:
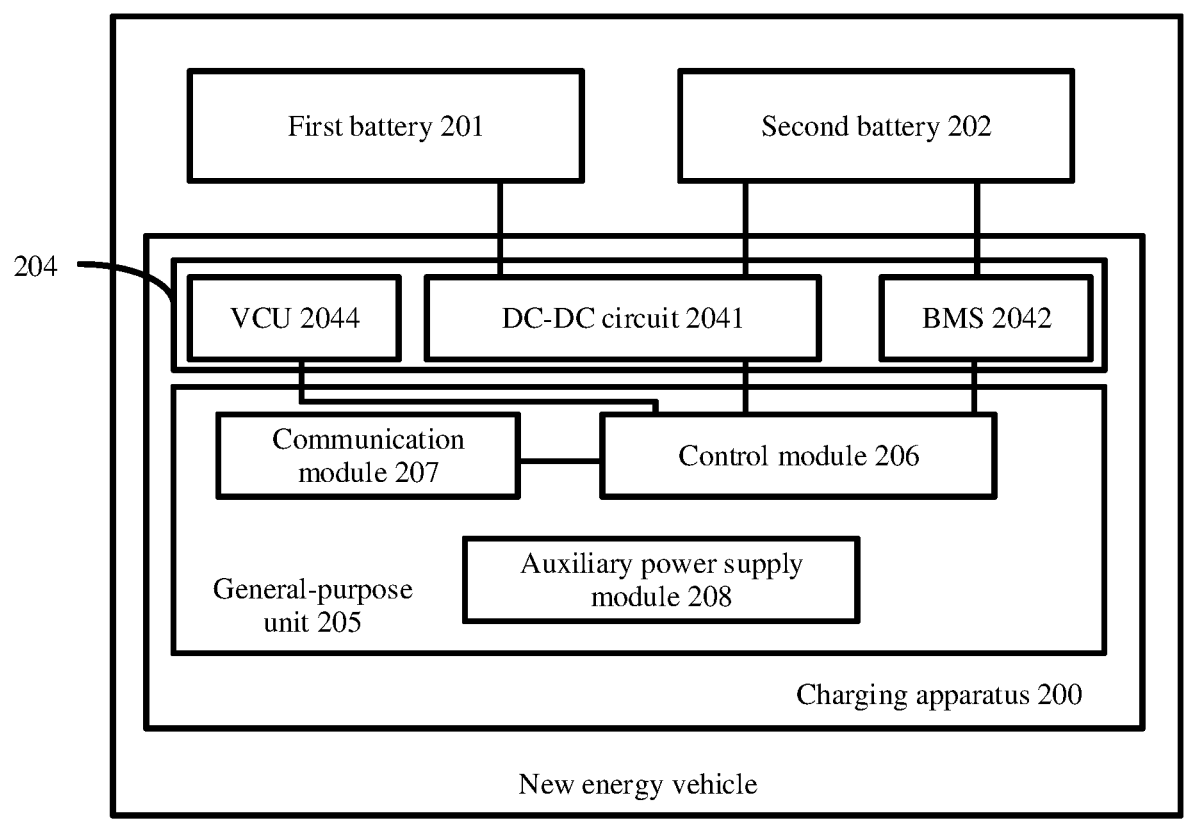
FIG. 11 is a schematic diagram of a tenth structure of a charging apparatus.

To further reduce a communication node and a control node in the new energy vehicle, refer to FIG. 11. FIG. 11 is a schematic diagram of a tenth structure of a charging apparatus. The charging unit 204 further includes a vehicle control unit VCU 2044. The VCU 2044 is configured to control charging/discharging timing and power-on/off timing of the new energy vehicle. For example, in a power-on timing procedure: The BMS 2042 is woken up, and is in an initialization (init) mode at this time. The BMS 2042 performs status self-check. If detecting no fault, the BMS 2042 sends a ready (ready) state to the VCU 2044. After completing the fault detection, the BMS 2042 waits for the VCU 2044 to send a power-on instruction. In this case, the new energy vehicle switches from the initialization mode to a standby mode for pre-charging. After the pre-charging is completed, the new energy vehicle enters a high-voltage powered-on mode, and finally enters an operation mode. In addition, the VCU 2044 functions as a control center in the new energy vehicle, and is further configured to manage and coordinate each unit in a drive system of the new energy vehicle, so that the new energy vehicle enters an optimal travel status. Because the VCU 2044 also has a main control chip used for control, a function of the main control chip may alternatively be implemented by using a controller in the control module 206. In some embodiments, the new energy vehicle can fully or partially complete an autonomous driving mode under coordinated control by the VCU 2044. After receiving sensed information sent by a sensor system, the VCU 2044 can control, based on the sensed information, a propulsion system to control a travel status.

For example, the new energy vehicle in the autonomous driving mode can implement self-control. In addition, by using a manual operation, the new energy vehicle can determine current states of the new energy vehicle and a surrounding environment of the new energy vehicle, determine possible behavior of at least one another vehicle in the surrounding environment, and implement real-time self-control based on determined information. The control module 206 controls the propulsion system to provide power for the new energy vehicle to move. The propulsion system may include an engine, a transmission apparatus, a wheel/tire steering unit, an accelerator, and a brake unit, to adjust a heading direction of the new energy vehicle. The brake unit is configured to control deceleration of the new energy vehicle. The brake unit can slow down wheels by using friction. Optionally, the brake unit may decrease a wheel rotation speed in another form, so as to control a speed of the new energy vehicle. In addition, the propulsion system may additionally or alternatively have another component. This is not specifically limited in this application.

The sensor system may include several sensors for sensing information about an environment in which the new energy vehicle is located. The sensors in the sensor system may include a global positioning system (GPS), an inertial measurement unit (IMU), a laser radar sensor, a camera sensor, a millimeter-wave radar sensor, and a brake configured to modify a location and/or an orientation of the sensor. The millimeter-wave radar sensor may use a radio signal to sense an object in the surrounding environment of the new energy vehicle. In addition to sensing an object, the millimeter-wave radar may be further configured to sense a speed and/or a heading direction of the object. The laser radar may use laser light to sense an object in an environment in which the vehicle is located. The laser radar may include one or more laser sources, a laser scanner, one or more detectors, and another system component. The camera sensor may be configured to capture a plurality of images of the surrounding environment of the new energy vehicle. The camera sensor may be a static camera or a video camera. The GPS may be any sensor used to estimate a geographic location. Therefore, the GPS may include a transceiver to estimate a location of the new energy vehicle relative to the Earth based on satellite positioning data. The sensors may further include an accelerometer and a gyroscope.

According to the charging apparatus provided in this application, under a background that an independent charging module and a lead-acid storage battery module in a conventional new energy vehicle are separate, in this application, integratable parts in the charging circuit and in the BMS are integrated together, so that an overall volume and weight can be greatly reduced, and a service life of the energy storage battery can be prolonged. On this basis, an architecture of the charging apparatus proposed in this application can further reduce a volume, simplify a vehicle communication and control architecture, save a vehicle layout space, reduce wire harness costs, and reduce overall costs of the charging module, the energy storage battery, and the BMS module.

This application further provides a new energy vehicle, including a first battery 201, a second battery 202, and the charging apparatus 200 according to any one of the foregoing embodiments. The first battery 201 is configured to provide driving power for the new energy vehicle, and the second battery 202 is configured to supply power to a vehicle-mounted load device.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A charging apparatus, applied to a new energy vehicle, wherein the new energy vehicle comprises a first battery and a second battery, wherein the first battery is configured to provide driving power for the new energy vehicle, wherein the second battery is configured to supply power to a vehicle-mounted load device, and wherein the apparatus comprises a charging unit and a general-purpose unit;
    wherein the charging unit comprises a direct current to direct current (DC-DC) circuit and a battery management system (BMS);
    wherein the general-purpose unit comprises a control module, a communication module, and an auxiliary power supply module, wherein the auxiliary power supply module is configured to supply power to the charging unit and the control module, and wherein the communication module is configured to establish a communication connection for the control module and another circuit inside the new energy vehicle; and
    wherein the control module is configured to control the charging unit to provide, to the second battery, electric energy output by the first battery, and wherein the control module is further configured to control the charging unit to connect the second battery to or disconnect the second battery from the first battery and the vehicle-mounted load device, and adjust charging and discharging power provided by the second battery for the vehicle-mounted load device.

2. The charging apparatus according to claim 1, wherein the control module is further configured to:
    control the DC-DC circuit to provide, to the second battery, the electric energy output by the first battery; and
    control the BMS to connect the second battery to or disconnect the second battery from the DC-DC circuit and the vehicle-mounted load device, and adjust the charging and discharging power provided by the second battery for the vehicle-mounted load device.

3. The charging apparatus according to claim 1, wherein the charging unit further comprises an on-board charger (OBC) unit; and
    wherein the control module is further configured to control the OBC unit to convert an alternating current input by an input alternating current source into a direct current, to provide the direct current to the first battery.

4. The charging apparatus according to claim 3, wherein the OBC unit further comprises a primary-side circuit, a first secondary-side circuit, and a second secondary-side circuit;
    wherein the primary-side circuit is separately coupled to the first secondary-side circuit and the second secondary-side circuit;
    wherein the primary-side circuit is connected to the input alternating current source, the first secondary-side circuit is connected to the first battery, the second secondary-side circuit is connected to the second battery;
    wherein the first secondary-side circuit comprises a first secondary-side winding, the second secondary-side circuit comprises a second secondary-side winding, and a quantity of first secondary-side windings is not less than a quantity of second secondary-side windings; and
    wherein the primary-side circuit is configured to receive an alternating current input by the alternating current input source, and separately output electric energy to the first secondary-side circuit and the second secondary-side circuit.

5. The charging apparatus according to claim 1, wherein the charging unit further comprises a vehicle control unit (VCU), and wherein the VCU is configured to perform vehicle control on the new energy vehicle.

6. The charging apparatus according to claim 1, wherein the general-purpose unit further comprises a voltage sampling module and a current sampling module;
    wherein the voltage sampling module is configured to detect an operating voltage of the second battery; and
    wherein the current sampling module is configured to detect an operating current of the second battery.

7. The charging apparatus according to claim 6, wherein the general-purpose unit further comprises a functional safety module, wherein the functional safety module is configured to:
    obtain the operating voltage of the second battery and the operating current of the second battery; and
    send, based on the operating voltage of the second battery being outside a specified voltage range, an alarm signal to the control module; and
    send, based on the operating current of the second battery being outside a specified current range, an alarm signal to the control module; and
    wherein the control module is further configured to control, based on receiving the alarm signal, the charging unit to disconnect the second battery from the first battery and the vehicle-mounted load device.

8. The charging apparatus according to claim 1, wherein the general-purpose unit further comprises a temperature sampling module, and wherein the temperature sampling module is configured to detect an operating temperature of the second battery.

9. The charging apparatus according to claim 8, wherein the charging apparatus further comprises an integrated vehicle thermal management unit, wherein the integrated vehicle thermal management unit comprises a heating module and a cooling module, and wherein the control module is further configured to:
 obtain the operating temperature of the second battery;
 control, based on the operating temperature of the second battery being lower than a first threshold temperature, the heating module in the integrated vehicle thermal management unit to heat the second battery; and
 control, based on the operating temperature of the second battery being higher than a second threshold temperature, the cooling module in the integrated vehicle thermal management unit to cool the second battery, wherein the first threshold temperature is lower than the second threshold temperature.

10. The charging apparatus according to claim 1, wherein the general-purpose unit further comprises an electromagnetic compatibility (EMC) module; and
 wherein the EMC module comprises at least one filter inductor, and the EMC module is configured to suppress differential mode noise and common mode noise in the charging unit by using the at least one filter inductor.

11. The charging apparatus according to claim 1, wherein the control module in the general-purpose unit is further configured to control the charging unit to provide, to the vehicle-mounted load device, the electric energy output by the first battery.

12. The charging apparatus according to claim 1, wherein the charging apparatus comprises a gun insertion status detection circuit, and wherein the general-purpose unit further comprises a wake-up module;
 wherein the gun insertion status detection circuit is configured to detect an access resistance of a charging gun, and send a wake-up signal to the wake-up module based on the access resistance; and
 wherein the wake-up module is configured to start the control module after receiving the wake-up signal.

13. The charging apparatus according to claim 1, wherein the second battery and the charging unit are installed in a same housing.

14. A new energy vehicle, wherein the new energy vehicle comprises a first battery, a second battery, and a charging apparatus, wherein the first battery is configured to provide driving power for the new energy vehicle, wherein the second battery is configured to supply power to a vehicle-mounted load device, and wherein the apparatus comprises a charging unit and a general-purpose unit;
 wherein the charging unit comprises a direct current to direct current (DC-DC) circuit and a battery management system (BMS);
 wherein the general-purpose unit comprises a control module, a communication module, and an auxiliary power supply module, wherein the auxiliary power supply module is configured to supply power to the charging unit and the control module, and wherein the communication module is configured to establish a communication connection for the control module and another circuit inside the new energy vehicle; and
 wherein the control module is configured to control the charging unit to provide, to the second battery, electric energy output by the first battery, and wherein the control module is further configured to control the charging unit to connect the second battery to or disconnect the second battery from the first battery and the vehicle-mounted load device, and adjust charging and discharging power provided by the second battery for the vehicle-mounted load device.

15. The new energy vehicle according to claim 14, wherein the control module is configured to:
 control the DC-DC circuit to provide, to the second battery, the electric energy output by the first battery; and
 control the BMS to connect the second battery to or disconnect the second battery from the DC-DC circuit and the vehicle-mounted load device, and adjust the charging and discharging power provided by the second battery for the vehicle-mounted load device.

16. The new energy vehicle according to claim 14, wherein the charging unit further comprises an on-board charger (OBC) unit; and
 wherein the control module is further configured to control the OBC unit to convert an alternating current input by an input alternating current source into a direct current, to provide the direct current to the first battery.

17. The new energy vehicle according to claim 16, wherein the OBC unit further comprises a primary-side circuit, a first secondary-side circuit, and a second secondary-side circuit;
 wherein the primary-side circuit is separately coupled to the first secondary-side circuit and the second secondary-side circuit;
 wherein the primary-side circuit is connected to the input alternating current source, the first secondary-side circuit is connected to the first battery, the second secondary-side circuit is connected to the second battery;
 wherein the first secondary-side circuit comprises a first secondary-side winding, the second secondary-side circuit comprises a second secondary-side winding, and a quantity of first secondary-side windings is not less than a quantity of second secondary-side windings; and
 wherein the primary-side circuit is configured to receive an alternating current input by the alternating current input source, and separately output electric energy to the first secondary-side circuit and the second secondary-side circuit.

18. The new energy vehicle according to claim 14, wherein the charging unit further comprises a vehicle control unit (VCU), and wherein the VCU is configured to perform vehicle control on the new energy vehicle.

19. The new energy vehicle according to claim 14, wherein the general-purpose unit further comprises a voltage sampling module and a current sampling module;
 wherein the voltage sampling module is configured to detect an operating voltage of the second battery; and
 wherein the current sampling module is configured to detect an operating current of the second battery.

20. The new energy vehicle according to claim 19, wherein the general-purpose unit further comprises a functional safety module, and wherein the functional safety module is configured to:
 obtain the operating voltage of the second battery and the operating current of the second battery; and
 send, based on the operating voltage of the second battery being outside a specified voltage range, an alarm signal to the control module; and send, based on the operating current of the second battery being outside a specified current range, an alarm signal to the control module; and wherein the control module is further configured to control, based on receiving the alarm signal, the charging unit to disconnect the second battery from the first battery and the vehicle-mounted load device.

* * * * *